(12) United States Patent
Wortmann et al.

(10) Patent No.: US 9,347,596 B2
(45) Date of Patent: May 24, 2016

(54) APPARATUS FOR HEATING A PIPELINE

(71) Applicant: BASF SE, Ludwigshafen (DE)

(72) Inventors: Jürgen Wortmann, Limburgerhof (DE); Michael Lutz, Speyer (DE); Martin Gärtner, Worms (DE); Kerstin Schierle-Arndt, Zwingenberg (DE); Stephan Maurer, Neustadt-Gimmeldingen (DE); Michael Ladenberger, Darstein (DE); Karolin Geyer, Mannheim (DE); Florian Garlichs, Neustadt (DE)

(73) Assignee: BASF SE, Ludwigshafen (DE)

( * ) Notice: Subject to any disclaimer, the term of this patent is extended or adjusted under 35 U.S.C. 154(b) by 83 days.

(21) Appl. No.: 14/188,895

(22) Filed: Feb. 25, 2014

(65) Prior Publication Data

US 2014/0238523 A1    Aug. 28, 2014

Related U.S. Application Data

(60) Provisional application No. 61/769,770, filed on Feb. 27, 2013.

(51) Int. Cl.
*H05B 1/02* (2006.01)
*F16L 53/00* (2006.01)

(52) U.S. Cl.
CPC .......... *F16L 53/007* (2013.01); *F16L 53/008* (2013.01)

(58) Field of Classification Search
CPC ..... F16L 12/006; F16L 53/005; F16L 53/007; F16L 53/008; A01B 12/006; H05B 1/02; H05B 3/0052; H05B 1/0244

USPC .......... 219/490, 483–486, 494; 392/465, 468, 392/469
See application file for complete search history.

(56) References Cited

U.S. PATENT DOCUMENTS

| 3,195,627 | A | | 7/1965 | Goodloe |
| 3,293,407 | A | | 12/1966 | Ando |
| 3,630,038 | A | * | 12/1971 | Ando .......................... 405/154.1 |
| 3,968,652 | A | | 7/1976 | Chevalier |
| 3,975,617 | A | * | 8/1976 | Othmer ......................... 392/469 |

(Continued)

FOREIGN PATENT DOCUMENTS

| DE | 859549 C | 12/1952 |
| DE | 1515139 B1 | 2/1970 |

(Continued)

OTHER PUBLICATIONS

International Search Report dated May 26, 2014 for PCT/EP2014/053706.

*Primary Examiner* — Mark Paschall
(74) *Attorney, Agent, or Firm* — Drinker Biddle & Reath LLP

(57) ABSTRACT

The invention relates to an apparatus for heating a pipeline system, comprising at least two pipelines (1), along which in each case one electrical resistance heating element extends, wherein a potential close to the ground potential is set at each electrical resistance heating element at at least one end (3, 5), and the electrical resistance heating element is connected to a terminal of a DC source or to in each case one phase (7) of an n-phase AC source (9) at a position remote from this end (3, 5), where, when using an n-phase AC source (9), n is an integer equal to or greater than 2.

15 Claims, 5 Drawing Sheets

(56) References Cited

U.S. PATENT DOCUMENTS

Figure 1:
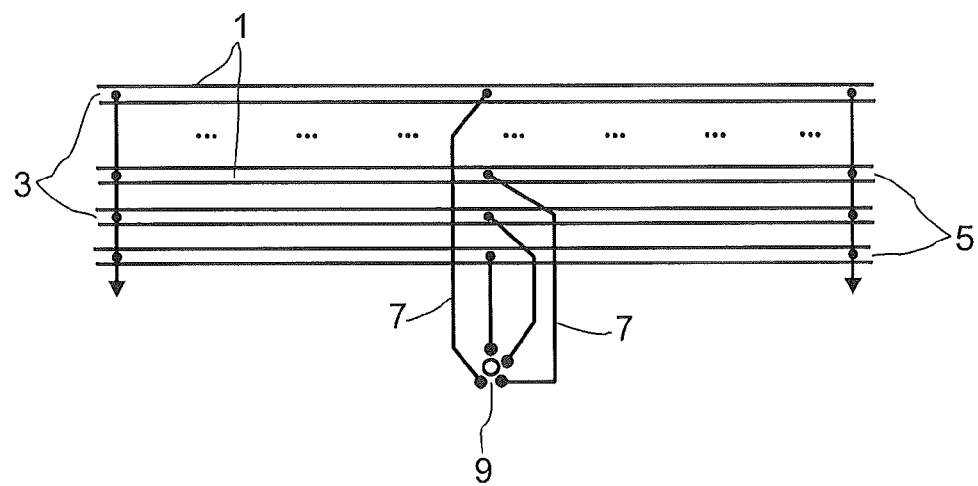

| | | | |
|---|---|---|---|
| 3,975,819 A | 8/1976 | Ando | |
| 4,127,103 A | 11/1978 | Klank et al. | |
| 4,147,155 A | 4/1979 | Krafft | |
| 4,200,148 A | 4/1980 | Friefeld et al. | |
| 4,253,491 A | 3/1981 | Worthen et al. | |
| 4,324,229 A | 4/1982 | Risser | |
| 5,256,844 A * | 10/1993 | Grosvik et al. | 219/629 |
| 5,862,800 A | 1/1999 | Marko | |
| 6,154,608 A * | 11/2000 | Rochelle | 392/487 |
| 6,167,883 B1 | 1/2001 | Beran et al. | |
| 6,246,831 B1 * | 6/2001 | Seitz et al. | 392/486 |
| 6,701,711 B1 | 3/2004 | Litwin | |
| 7,011,086 B2 | 3/2006 | Litwin | |
| 7,260,320 B2 * | 8/2007 | Stanzel et al. | 392/468 |
| 7,932,480 B2 * | 4/2011 | Gu et al. | 219/482 |
| 2002/0122664 A1 | 9/2002 | Mjelstad et al. | |
| 2004/0108099 A1 | 6/2004 | Litwin | |
| 2005/0126560 A1 | 6/2005 | Litwin | |
| 2006/0102806 A1 | 5/2006 | Noseworthy | |
| 2006/0130654 A1 | 6/2006 | King et al. | |
| 2008/0196917 A1 | 8/2008 | Hofmann et al. | |
| 2009/0199557 A1 | 8/2009 | Bennett | |
| 2009/0260359 A1 | 10/2009 | Palkes | |
| 2010/0101564 A1 | 4/2010 | Iannacchione et al. | |
| 2010/0199974 A1 | 8/2010 | Plotkin et al. | |
| 2011/0139144 A1 | 6/2011 | Zheng | |
| 2011/0277470 A1 | 11/2011 | Benyaminy et al. | |

FOREIGN PATENT DOCUMENTS

| | | |
|---|---|---|
| DE | 10327493 A1 | 1/2005 |
| EP | 1958832 A1 | 8/2008 |
| EP | 2006593 A1 | 12/2008 |
| FR | 2722359 A1 | 1/1996 |
| GB | 2437161 A | 10/2007 |
| JP | 08-320096 A | 12/1996 |
| SU | 540102 A1 | 12/1976 |
| WO | WO-2006/075913 A1 | 7/2006 |
| WO | WO-2007/000569 A1 | 1/2007 |
| WO | WO-2012/156472 A1 | 11/2012 |

* cited by examiner

APPARATUS FOR HEATING A PIPELINE

CROSS-REFERENCE TO RELATED APPLICATIONS

This application claims benefit (under 35 USC 119(e)) of U.S. Provisional Application 61/769,770, filed Feb. 27, 2013, which is incorporated by reference.

The invention is based on an apparatus for heating a pipeline, comprising an electrical resistance heating element, which extends along a pipe. The electrical resistance heating element can be formed from the pipeline itself, but can also contain additional heating elements, for example in the form of an internal heating conductor, which are electrically connected at their ends to a voltage source.

An apparatus for heating pipelines is required, for example, in linearly concentrating solar power plants, in particular parabolic trough solar power plants or Fresnel power plants, in which a molten salt flows through pipelines. In such solar power plants, the pipelines are connected to form networks, which are used for capturing solar energy in the solar power plant. In such networks, the radiation energy from the sun is concentrated by means of mirrors onto specially thermally insulated pipelines. The pipelines are formed from collectors connected in series. A collector comprises a mirror system which concentrates the radiation energy from the sun onto a pipeline section, a so-called receiver.

Another example of an application for pipelines which are advantageously heated is pipelines through which melts are transported over long distances, for example pipelines for liquid sulfur.

In solar power plants, the radiation energy captured by the receivers is transferred to a heat transfer fluid. At present in particular a biphenyl/diphenyl ether mixture is used as heat transfer fluid, but this is limited in terms of its maximum operating temperature owing to its decomposition temperature of approximately 400° C. In order to achieve higher operating temperatures which enable a higher degree of efficiency, other heat transfer fluids are required. For this purpose, in particular molten salts, in particular molten nitrate/nitrite salts, for example so-called solar salt 60, a mixture of sodium nitrate and potassium nitrate in a ratio 60:40, are used.

However, one disadvantage of the molten salts is their high melting point. A sodium/potassium nitrate mixture melts, for example, at the eutectic point, i.e. in the case of a mixing ratio 56:44 at a temperature of 218° C. In long pipeline networks, as occur in solar power plants, it is difficult to work safely with molten salts with high melting points. Freezing of the molten salts can cause considerable economic damage in pipeline systems. One cause of the damage is, for example, the considerable volume expansion of molten salts as they melt. There is the risk of fittings and pipelines being subjected to pressure and being severely damaged.

In order to prevent freezing of the molten salts, it is conventional at present to empty the pipeline system in the case of a long interruption to the operation of the solar power plant. Alternatively, it is also possible to heat the pipeline system on an interim basis. For this purpose, for example, electrical energy can be used or heat from available heat stores can be utilized. If heat from available heat stores is utilized, a hot heat transfer fluid is usually pumped through the pipeline system. These methods have the disadvantage that considerable quantities of energy in the form of electrical energy or in the form of thermal energy need to be applied for this purpose.

When electrical heating is provided for pipelines, this is at present conventionally realized by additionally providing mineral-insulated electrical heating conductors which are resistant to high temperatures. In the case of solar receivers, as are used in parabolic trough solar power plants, however, this technology cannot be used since the individual receivers have very good thermal insulation with respect to the surrounding environment and therefore also with respect to an additionally provided mineral-insulated high-temperature heating conductor owing to an evacuated glass jacket. At present, receivers are therefore heated electrically by virtue of a high current intensity being applied to the pipeline system itself at a low voltage. This method is also referred to as Joule heating or impedance heating. However, this has the disadvantage that different levels of transfer resistances or thermal losses can occur at the pipeline connectors. Greater heating occurs at the points with a high resistance. There is therefore the risk of nonuniform heating and of local points where the melting point of the salt used as heat transfer agent is undershot. These difficulties can be circumvented by additionally providing an internal heating conductor which is not insulated from the enveloping pipeline and has a constant electrical resistance over the entire heating path, which internal heating conductor is connected electrically to the pipeline at both ends.

If a voltage is applied over a Joule heating path or over an uninsulated internal heating conductor, a separate electrical conductor needs to be laid parallel to the pipeline in order to close the electrical circuit. It is conceivable for current to be conducted below ground, but this would generally not withstand the high current intensities required for heating. The electrical resistances in the soil are so high, as is to be expected, that the heating power at the pipeline to be heated is weakened until there is a complete loss of functionality. This is demonstrated in particular in the case of long pipelines with lengths of more than 100 m.

A pipeline section is generally part of a larger pipeline network. This connected network is naturally at a potential which is close to ground, referred to as ground potential, since the pipeline network of a process-oriented installation generally has many low-resistance connections to the potential of the surrounding environment. In order that no effective parasitic current flows occur between the pipeline network and the heated pipeline section, the two ends of the pipeline section need to be at the electrical potential of the pipeline network, namely ground potential. Molten salts generally have good electrical conductivity. Therefore, it is not possible to prevent a parasitic current flow as a result of the mutual electrical insulation of pipeline segments. The molten heat transfer salt would conduct the electrical current beyond the insulation.

It is conventional to form pipeline sections in linearly concentrating solar power plants in such a way that they are arranged in the form of loops next to one another. In this case, the wiring of the electrical heating element can be arranged in such a way that the loop-shaped pipeline section at the connections to the pipeline network of the installation is at ground potential and is connected to a terminal of a current source at the reversal point in the loop. The second terminal of the voltage source is connected to the grounded end of the heating element via a low-resistance return line path. Owing to the use of this return line path, current is prevented from flowing away into the surrounding environment in an uncontrolled manner and the full functionality of the heating conductor is ensured.

In the case of long pipeline loops, however, such return line paths are disadvantageous. In order to achieve sufficiently high conductivity of the return line path, lines with a large cross section are required, for example thick copper cables or copper rails.

The object of the present invention is to reduce the consumption of resources, in particular the consumption of copper, when constructing heating systems by virtue of the possibility of dispensing with a return line path completely whilst entirely maintaining the heating function.

This object is achieved by an apparatus for heating a pipeline system, comprising at least two pipelines, along which in each case one electrical resistance heating element extends, with a potential close to the ground potential being set at each resistance heating element at at least one end and being connected to a terminal of a DC source or to in each one phase of an n-phase AC source at a position remote from this end, where, when using an n-phase AC source, n is an integer which is equal to or greater than 2.

If the potential difference produced by the current sources is floating, the contact with the installation at the beginning of the loop results in a potential there which virtually corresponds to that of the ground. Floating potential differences of current sources can be formed easily, for example, by means of transformers which are ungrounded on the secondary side.

A potential close to the ground potential in the context of the present invention means a potential which is set when an electrical conductor is grounded or alternatively a potential which is set when two opposite phases with the same magnitude for the current intensity and voltage meet one another in an electrical conductor and thus cancel one another out or when, in an electrical conductor, a positive and a negative component of a DC voltage with the same magnitude for the voltage and the current intensity meet one another and thus cancel one another out at a neutral point. The circuit therefore corresponds to a double star circuit. This can be achieved, for example, by virtue of the fact that an electrical resistance heating element is connected to a phase of an AC source, and a second electrical resistance heating element is connected to a second phase of the AC source, which is in opposition to the first phase, and the two electrical resistance heating elements are electrically connected to one another at their ends. Alternatively, an electrical resistance heating element can correspondingly also be connected to the positive terminal of a DC voltage source and the second electrical resistance heating element to the negative terminal of the DC voltage source. The electrical circuit is closed at the point at which the electrical resistance heating elements are connected electrically at an end remote from the electrical connection, and the potentials fed into the electrical resistance heating elements cancel one another out at the point at which the ends of the electrical resistance heating elements are electrically connected. In this way, a potential close to the ground potential is set at one end of the electrical resistance heating elements without the electrical resistance heating elements being grounded.

The connection of the electrical resistance heating element to a phase of an AC source or to a terminal of a DC source can take place at one end of the electrical resistance heating element or at any desired position between the two ends of the electrical resistance heating element. It is preferred if a potential close to the ground potential is set at the electrical resistance heating element at both ends and the resistance heating element is connected to the terminal of the DC source or the phase of the AC source between the ends. The position at which the electrical resistance heating element is connected to the terminal of the DC source or the phase of the AC source is dependent on the resistances of the electrical resistance heating element and the desired heating task. The resistance of the electrical resistance heating element can be realized, for example, by using materials with different electrical conductivities or using different line cross sections. If, owing to manufacturing tolerances, different resistances result over the length of the electrical resistance heating element, but overall the same heating power is intended to be output, this can also result in a position of the connection which is not in the center of the electrical resistance heating element. Alternatively, a non-central position of the connection is selected, for example, when a higher heating power is required in a region of the pipeline to be heated than is required in another part of the pipeline, for example as a result of poorer insulation in a region. An increase in the heating power given the same line cross section is in this case achieved by shortening the distance between the connection of the terminal of the DC source or the phase of the AC source and the end at which a potential close to the ground potential is set.

In a preferred embodiment, each electrical resistance heating element is divided into at least two section, with a potential close to the ground potential being set at the ends of each section, and a terminal of a DC source or a phase of an AC source being connected between the ends, with in each case the ends of all sections which are fed from a DC source or an n-phase AC source being electrically connected to one another at a low resistance, i.e. at a resistance which is markedly lower than the resistance of the pipeline. Owing to the electrical connection of the ends of all of the sections which are fed from a DC source or an n-phase AC source, the individual currents in the respective electrical resistance heating elements cancel one another out. In particular when using an AC source with an uneven number of phases, where it is not possible to feed two phases which are shifted through 180° into two electrical resistance heating elements which are connected to one another at one end, the electrical connection between the ends of the electrical resistance heating elements which are fed from an AC source means that the phases of the AC source cancel one another out owing to the electrical connection and in this way a potential close to the ground potential is set at the ends of the electrical resistance heating elements.

In one embodiment of the invention, each section is fed from at least two current sources, with the possibility of each current source being a DC source or an AC source, and with the current sources each being connected at different positions on the electrical resistance heating element. One advantage of the use of a plurality of current sources consists in that different path lengths of the electrical resistance heating element and therefore individual heating powers for the individual path sections can be realized between the current sources.

In one embodiment of the invention, the DC source or the phase of an AC source is floating, i.e. only a voltage difference but no absolute potential is present at the voltage source. If the self potential of all current sources is floating, it is possible in principle for current sources which are connected electrically to one another to be operated simultaneously. In the case of AC voltages, however, disruptive couplings via the inductance of the electrical circuits are possible. In particular when different path lengths and individual heating powers are intended to be set, it is possible for at least one current source from which the section is fed to be a DC source and at least one current source to be an AC source. This has the advantage that both current sources can be operated simultaneously. Depending on the position of the current sources, individual heating powers can thus be set in the respective subsections between the current sources or between one end at which a potential close to the ground potential is set and an adjacent current source. The risk of disruptive coupling of the electrical circuits is also reduced when all of the current sources are AC sources which are operated at markedly different frequencies or on phases which are shifted with respect to one another.

In addition to the simultaneous operation of the current sources, it is also possible to operate the current sources alternately. In this case, current is fed into the respective section in each case only from one current source. The alternate operation is also possible whenever all of the current sources are AC sources or all of the current sources are DC sources. When all of the current sources are AC sources, care also does not need to be taken in the case of alternate operation that the current is fed with a mutually shifted phase or at different frequencies. Since in each case only one current source feeds current, it is also not possible for any currents of different current sources to influence one another within the section. It is of course also possible with alternate operation to use AC sources which are operated with mutually shifted phases or at different frequencies.

If the number of pipelines to be heated is greater than the number of terminals of the DC source or the number of phases of the AC source, it is possible, when using DC sources, for, in the event of a number of pipelines which is greater than two, in each case two pipelines to be combined to form a group, with the electrical resistance heating elements of said pipelines being connected to the terminals of a DC source or, when using n-phase AC sources, for, in the event of a number of pipelines which is greater than n, in each case n pipelines to be combined to form a group, with the electrical resistance heating elements of said pipelines being connected to the phases of an AC source.

An n-phase AC source can be realized, for example, by the multi-pole feed being formed from converter or thyristor circuits. Transformers with an appropriate transformation ratio enable matching to the resistance of the pipelines.

If a pipeline bundle has a plurality of heating sections, it is possible with the aid of electronic switching devices to design the heating sections to have different voltage patterns, wherein the voltage level, voltage duration and frequency can be selected to be different for each heating section.

The electrical resistance heating element used for the heating of pipelines can be, for example, a heating conductor routed in the pipeline. Alternatively, it is also possible for the wall of the pipeline to be at least partially electrically conductive and for the electrical resistance heating element to be formed by the wall of the pipeline.

In particular in pipelines through which molten salts are passed, a heating conductor routed in the pipeline has the advantage that, in the event of solidification of the salt, the salt is melted uniformly and a channel is formed along the heating conductor, through which channel the salt, whose volume enlarges on melting, can flow away.

If the electrical resistance heating element is formed by the wall of the pipeline, it is preferred if, in order to introduce current, a metal strip coated with a layer of a material with good electrical conductivity is fastened electrically conductively radially on the wall of the pipeline and the metal strip has a lug protruding away from the pipeline, on which lug a current source can be connected. By virtue of the heating conductor fastened radially on the pipeline, the current can be fed uniformly over the circumference of the pipeline.

The metal strip is preferably manufactured from the same material as the pipeline. In particular when the pipeline and also the metal strip are manufactured from a material which does not have good electrical conductivity, the coating with the material with good electrical conductivity ensures a sufficiently low resistance for the introduction of current in order to keep the heating of the metal strip as low as possible.

Since materials expand differently depending on the temperature, it is advantageous, in particular in the case of long pipelines, to divide the pipeline into sections which are connected to one another by compensators. Such compensators are configured such that mechanical forces as a result of the expansion of the length of the pipeline are compensated for. If the pipeline is used as resistance heating element, it is necessary to connect the individual pipeline sections electrically to one another. For this purpose, it is possible, for example, to bring the pipeline sections into electrical contact with one another by means of at least one adapter conductor passing through the compensator. The adapter conductor is particularly preferably a heating conductor which can be designed as described below.

Molten salts are used in particular in solar power plants, for example parabolic trough power plants or Fresnel power plants as heat transfer agent. Pipelines in such power plants have in each case curvature-free paths with a length of at least up to 100 m, usually up to 600 m. Owing to the long straight paths, it is possible to insert a heating conductor into the pipe without said heating conductor needing to be routed around bends in the pipe.

In a preferred embodiment, the heating conductor is arranged eccentrically in the pipe, with the spacing of the heating conductor being greater at the bottom than it is at the top in the case of a pipe section which runs at a maximum gradient of 45°. Laying the heating conductor eccentrically in the pipe prevents sagging regions of the heating conductor between two fastening points, which result in the case of a temperature-related length expansion of the heating conductor, from resulting in the heating conductor touching the inner wall of the pipeline. Even in the event of sagging, it is necessary for the heating conductor not to have any loose direct contact with the inner wall of the pipeline. In order to fasten the heating conductor, it is possible, for example, for said heating conductor to be routed in eyelets in the pipeline through which the molten salt is flowing.

In the case of a gradient of more than 45°, in particular in the case of perpendicularly running pipeline sections, it is preferable if the heating conductor runs centrally in the pipeline.

In addition to pipelines in solar power plants, the apparatus according to the invention is also suitable for all other pipeline systems with at least two pipelines which are intended to be heated, however. A heat transfer agent can flow through such pipelines, for example. The apparatus according to the invention is also suitable, for example, for pipelines through which crude oil is being transported. In particular at low external temperatures, it is thus possible to prevent the oil in the pipeline from solidifying and blocking the pipeline. Furthermore, the apparatus according to the invention can also be used to keep the temperature of a medium flowing through the pipeline stable, in addition to providing insulation, in order to prevent the medium flowing through the pipeline from cooling down. It is of course also possible to use the apparatus according to the invention for further heating a medium flowing through the pipeline.

Particularly preferred is the use of the apparatus according to the invention in pipelines in solar power plants, however, in particular in order to melt a frozen heat transfer agent, for example solar salt, once it has frozen, as may occur when the solar power plant is at standstill. In this case, the pipeline forms a heating loop in the solar power plant, for example.

As an alternative to a heating conductor laid in the pipeline, the electrical heating element can also assume any other desired shape, with which heating of the pipeline is possible. Thus, for example, it is also possible to provide an external heating conductor which rests on the outside of the pipe wall. It is also possible to provide the pipeline with an electrically conductive inner jacket or outer jacket which acts as heating element. However, the electrical heating element is particularly preferably a heating conductor lying in the pipeline.

Depending on the medium which is being transported through the pipeline, the electrical heating conductor can be provided with or without insulation. In particular when transporting an electrically conductive medium in the pipeline, it preferable for the heating conductor to be electrically insulated. In this case, the temperature of the medium guided in the pipeline also still needs to be taken into consideration. The material for the electrical insulation of the heating conductor needs to be selected such that it is stable to the temperatures occurring in the pipeline and in particular to the temperature of the electrical heating conductor.

In the case of an electrical heating conductor which is routed in a pipeline guiding molten salt, it is preferable to configure the heating conductor in the form of a pipe or a channel with any desired cross section and to provide the wall of the pipe or the channel with openings, through which molten salt can flow into the interior of the heating conductor, which is in the form of a pipe or channel, and is transported in the interior of the heating conductor in order to form, on melting of the salt, a channel as quickly as possible, through which the molten salt can flow.

In addition to a solid outer wall which is provided with openings, it is alternatively also possible to configure the heating conductor in the form of a ring-shaped knitted fabric or woven fabric, for example. For this purpose, too, a cavity is formed in the interior of the knitted or woven fabric, through which cavity already molten salt can flow.

As an alternative to the configuration of the heating conductor as a hollow body, with a channel being formed in the interior of said hollow body, through which channel the molten salt can flow, it is also possible for the heating conductor to have at least one u-shaped or v-shaped depression extending in the axial direction. In the depression, the salt will first melt, with the result that the depression forms a channel, through which the molten salt can flow. A heating conductor with more than one u-shaped or more than one v-shaped depression can have a star-shaped cross section, for example. It is also possible for such a heating conductor to be configured in the form of a channel with a u-shaped cross section, for example.

In addition to a hollow body or a heating conductor which has at least one u-shaped or v-shaped depression, it is furthermore also possible to provide a solid electrical conductor, for example, which has wire mesh wound around it. In this case, the molten salt can first flow in the wire mesh before a channel surrounding the heating conductor has formed outside the wire mesh.

In addition to the abovementioned possibilities, it is of course also possible for the heating conductor to be a solid wire or to be in the form of a cable. The heating conductor can also be formed from a material with good electrical conductivity, for example copper or aluminum, which is surrounded by a corrosion-resistant sheath. This prevents the material with good electrical conductivity from corroding in the presence of the salt which is flowing through the pipeline, as a result of which the heat transfer salt becomes contaminated and loses its thermal resistance.

Furthermore, it is also possible to use a conventional conductor, for example with a current-conducting core and electrical insulation, as internal heating conductor, with in addition a corrosion-resistant sheath being applied to the electrical insulation. A protective metal sheath as corrosion-resistant sheath can in this case also act as return conductor for the current. Alternatively, a two-core arrangement with an insulated outer sheath consisting of stainless steel can also be used. Such insulated heating conductors can also rest on the wall of the pipeline.

The heating conductor can also be constructed from segments, for example one segment per receiver in solar power plants, which are electrically conductively connected to one another, for example by means of screwing, welding or clamping, during installation. The design of segments also provides a concept for the replacement of a receiver within a row by means of cutting and reconnecting. The connections need to be configured in such a way that sufficiently low transfer resistances are permanently realized.

When the heating conductor is in the form of a cable, one or more litz wires are twisted to form a cable. The cable is preferably formed from more than one litz wire. By virtue of twisting the litz wires to form a cable, an interstitial channel is formed in the center of the cable, through which interstitial channel already molten salt can flow and the pressure can thus be compensated. By twisting a cable with a litz wire, a spiral winding can be manufactured which has an interstitial channel in its center. A further advantage of the use of a cable is that the horizontal compensation of the thermal expansion can be facilitated. In addition it is possible to adjust the rigidity of the conductor by the kind of stranding, with the result that, given corresponding twisting, the cable has a strength approaching the strength of a rigid conductor. This makes it possible to provide a smaller number of holders for securing the cable against displacement in the direction of flow.

The litz wires used for producing the cable by twisting can be in the form of wires, i.e. can be solid, or else can be in the form of tubes. When the litz wires are in the form of tubes and are not filled with a highly electrically conductive material or a flowing heat transfer agent, these litz wires are preferably sealed by welding at each of the ends. The individual tubes are preferably filled with a gas, for example air. As a result of the gas in the tubular litz wires, the upward force in the molten salt is increased. This makes it possible to reduce the holding force of the springs required for fixing close to the pipe center. The tubular litz wires can have a circular cross section or a non-circular cross section. A non-circular cross section is, for example, an oval or an elliptical cross section. In the case of a non-circular cross section, it is possible for increased pressures which occur locally on melting of the salt to be absorbed elastically more effectively. In addition, non-circular cross sections enlarge the interstitial cross section and, as a result, facilitate the pressure compensation flow in the interstitial channel. In order to obtain a non-circular cross section, it is possible, for example, to produce tubes for forming the litz wires and to flatten these tubes, for example by means of rolling. A further possibility for forming a litz wire with a non-circular tube is a kidney-shaped cross section. By virtue of the kidney-shaped cross section which is produced, for example, when round tubes are twisted with pinching over a round forming mandrel, a particularly large interstitial channel is formed between the litz wires. Since the litz wires are accommodated in a molten salt, it is advantageous to anneal the mechanically deformed parts in stress-free fashion in order to minimize the risk of corrosive attack.

In the case of a tubular configuration of the litz wires, it is also possible, in addition to the electrical heating, to use a liquid or gaseous heat transfer agent for heating, which heat transfer agent flows through the tubular lines.

If the pipeline is used as a pipeline in a solar array of a parabolic trough solar power plant or Fresnel power plant, the pipeline generally comprises an inner pipe, through which the molten salt flows, and an outer sleeve consisting of glass. The interspace between the inner pipe and the outer sleeve consisting of glass is evacuated. The surface of the inner pipe is usually configured such that it absorbs the solar radiation and is thus heated. The heat is then transferred from the inner pipe to the heat transfer agent which is flowing through the pipes. These regions are generally also referred to as receivers.

In said solar power plants, the pipelines generally have a u-shaped profile, with a limb of the pipeline being connected to an inflow and a second limb being connected to an outflow. The limbs of the pipeline extend, without curvature, over a path of generally at least 100 m, preferably over at least 300 m. On the side opposite the inflow and the outflow, the two limbs are connected to one another via a transverse pipe piece. The molten salt then flows via a bend into the crosspiece and from the bend into the parallel second pipeline forming the second limb. In a preferred embodiment, the bends in the pipe for deflecting the flow each have a pipeline section which continues in the direction of the pipeline, with the pipeline section being sealed with a closure and the heating conductor being routed through the closure of the pipeline section. In order that no voltage can be transferred to the pipeline during operation of the insulated heating conductor, the heating conductor is generally routed through the closure of the pipeline with insulation. The insulation at the same time serves for sealing purposes.

The closure of the pipeline section can be in the form of a blind flange, for example. Any other desired cover which withstands the pressure occurring in the pipelines can also be used. However, a blind flange is preferred.

Irrespective of the type and form of the heating conductor, a round rod is preferably attached to the end of the heating conductor. This round rod can be connected to the heating conductor, and connected in insulating or non-insulating fashion to the pipeline, by a welded joint, a screw connection or a clamping connection, for example. In this case, the connection needs to be configured such that the round rod is connected to the heating conductor with good electrical conductivity. When the closure of the pipeline section is a blind flange, the round rod is guided, for fastening, in electrically insulating or non-insulating fashion in a stuffing box construction, for example, and fastened. In order to prevent, in the case of the insulated heating conductor, electrical current from being passed to the pipes, the stuffing box packing of the stuffing box construction is electrically insulating. By virtue of the stuffing box packing, a gap between the round rod and the bushing of the heating conductor into the pipeline is provided. A low voltage of up to 0.7 V can be present across the gap. Despite the low voltage, a high electrical field strength prevails in the gap and in the vicinity of the gap. This high electrical field strength effects a current flow to and over the pipeline wall when the pipeline system is filled with electrically conductive molten salt.

Complete electrical insulation of the internal conductor in the interior of the pipeline close to its entry, for example via the blind flange, suppresses an undesired current flow. The electrical insulation can be constructed, for example, in the region of a stuffing box or in the region of a flat seal. When a flat seal is used, electrically insulated screw connections also need to be used.

Since materials used for the electrical insulation are generally not resistant to the temperatures which prevail in the interior of the pipelines owing to the molten salts, it is possible to produce a temperature a gradient owing to suitable thermal insulating materials. It is thus possible, for example, to accommodate a fiber material for the thermal insulation in the region of the blind flange in the pipeline. The fiber material may be, for example, a quartz fiber woven fabric. The round rod on which the heating conductor is fastened is guided through an electrically insulating sleeve which is resistant to high temperatures, for example consisting of ceramic or silicon carbide. The first sleeve consisting of ceramic or silicon carbide is adjoined by a second electrically insulating sleeve, which no longer needs to be resistant to high temperatures. Suitable materials for the second sleeve are, for example, polytetrafluoroethylene (PTFE) or another high-temperature polymer. The two electrically insulating sleeves are surrounded by a further sleeve, which ends in a flange. The flange is sealed with electrical insulation with a second flange. In order to pass the round rod through the sealing flange, a stuffing box is used which is sealed off with a seal. Owing to the insulating materials used, the temperature in the region of the stuffing box is so low that the seal can be manufactured from a standard material.

When the solidified salt is intended to be melted in the pipeline, the heating conductor only needs to produce a small quantity of heat in the region of the entry in order not to jeopardize the formation of a temperature gradient. This can be achieved, for example, by virtue of the fact that the heating conductor has a lower electrical resistance in the region of its entry into the pipeline than in the actual heating zone. The lower electrical resistance can be achieved, for example, by virtue of the fact that the round rod into which the heating conductor opens out has a larger diameter than the heating conductor in the heating zone. As an alternative or in addition, the heating conductor can contain, in the region of the entry into the pipeline, a material with particularly good electrical conductivity in order to avoid heating of the heating conductor in the region of the entry into the pipeline. A suitable material with good electrical conductivity is copper or aluminum, for example. In this case, the heating conductor can be manufactured completely or partially from the material with good electrical conductivity in the region of the entry. It is thus possible, for example, to construct the heating conductor in the region of the entry in such a way that it contains a solid copper core.

As an alternative to a round rod, a rod with any other desired cross section can also be used. However, a round rod is preferred.

The internal conductor can also be built into the pipeline system without any insulation. In this case, the entry is configured without any provision of insulation. This is particularly advantageous when, for example, individual pipeline sections of a solar loop are not connected to one another by flange connections, but are welded to one another. Then, it is no longer possible to control the electrical resistance of the entire pipeline by means of insulation for the individual pipeline sections. When the heating conductor is not electrically insulated from the pipeline sections which are welded to one another, currents with a ratio proportional to the ratio of the conductivity of the pipeline to the conductivity of the heating conductor flow through the individual pipeline sections and the internal conductor when a voltage is applied. According to the ratio, heat is generated at the pipeline or at the heating conductor. By selecting a sufficient cross section for the heating conductor and selecting a material with very good electrical conductivity for the heating conductor, for example copper or aluminum, the resistance of the heating conductor can be reduced to such an extent and the conductivity increased to such an extent that the current is conducted into the internal conductor with a sufficient intensity and the development of heat is concentrated on the heating conductor routed in the interior of the pipeline to such a degree that the internal heating conductor is heated more quickly than the pipeline. The fact that the pipeline has a generally markedly higher mass and therefore a markedly higher thermal capacity than the internal conductor contributes to more rapid heating of the internal conductor.

In the case of such an arrangement with an uninsulated heating conductor, no potential differences between the heating conductor and the pipeline ideally arise over the entire pipeline. The pipeline needs to be electrically insulated with respect to the apparatus structure supporting the pipeline.

In order that the heating conductor is not damaged by the molten salt flowing through the pipeline, said heating conductor is preferably manufactured from a material which is resistant to corrosion resulting from the salt used, in particular nitrate. Alternatively, it is possible, as already mentioned above, to provide the heating conductor with a corrosion-resistant sheath. If the heating conductor is manufactured from a corrosion-resistant material, in particular stainless steel, for example preferably steels of the type St 1.4571 and St 1.4541, and also St 1.4301 or nickel-based steels such as St 2.4856 are suitable, depending on the temperature.

When a stainless steel, for example St 1.4571 is used, a passivating, approximately 15 μm-thick corrosion-inhibiting metal oxide/nitride layer is first formed on the heating conductor, which layer offers an appreciable resistance to the current flow. The resistance of the protective layer helps in controlling the potential of the heating conductor system. Even low electrical voltages can trigger electrode processes at conductive salts which result in corrosive damage. The electrode processes can set in above a certain limit voltage. The corrosion-inhibiting protective layer causes protection as a result of overvoltage and thus increases the decomposition voltage of the system.

The use of the heating conductor in the interior of the pipeline makes it possible for high melting points of the heat transfer agent used in the pipeline to prevail. This opens up the possibility of also using salt mixtures as heat transfer agent which have a higher melting point than previously discussed salt mixtures. Thus, for example, nitrate mixtures can be used which contain sodium nitrate as main component. This has the advantage that potassium deposits which can be used for producing potassium fertilizer are largely spared. At present, so-called "solar salt 60" contains 60% by weight sodium nitrate and 40% by weight potassium nitrate. The proportion of sodium nitrate in the salt can be increased to 80% by weight or even to over 90% by weight or more. The melting point of the salt increases correspondingly from 235° C. in the case of a mixture with 40% by weight potassium nitrate and 60% by weight sodium nitrate to 273° C. in the case of a mixture with 80% by weight sodium nitrate and 20% by weight potassium nitrate and to 293° C. in the case of a mixture with 90% by weight sodium nitrate and 10% by weight potassium nitrate. When using pure sodium nitrate, the melting point is 306° C.

Exemplary embodiments of the invention are illustrated in the figures and will be explained in more detail in the description below.

Figure 2:
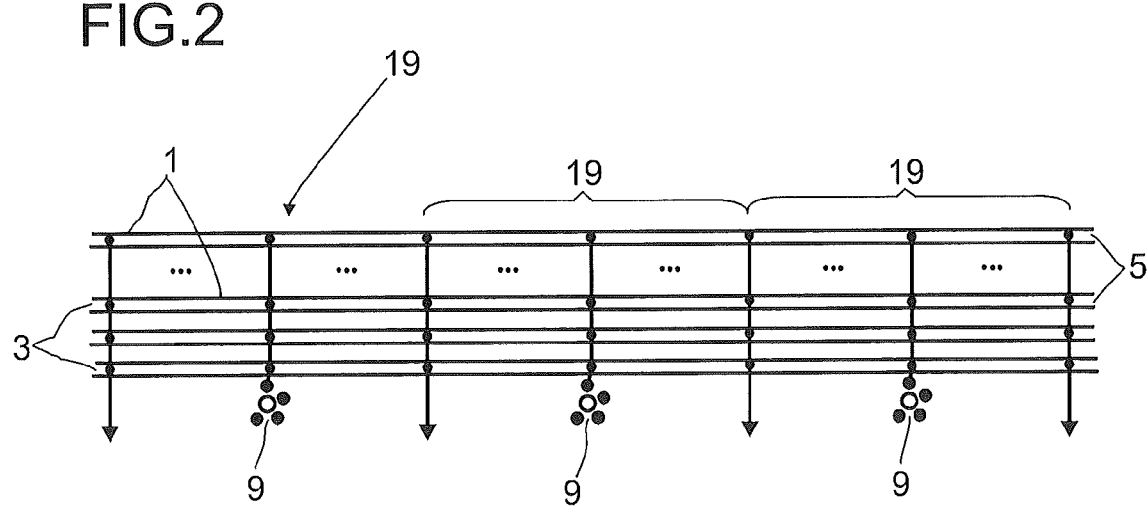
Figure 3:
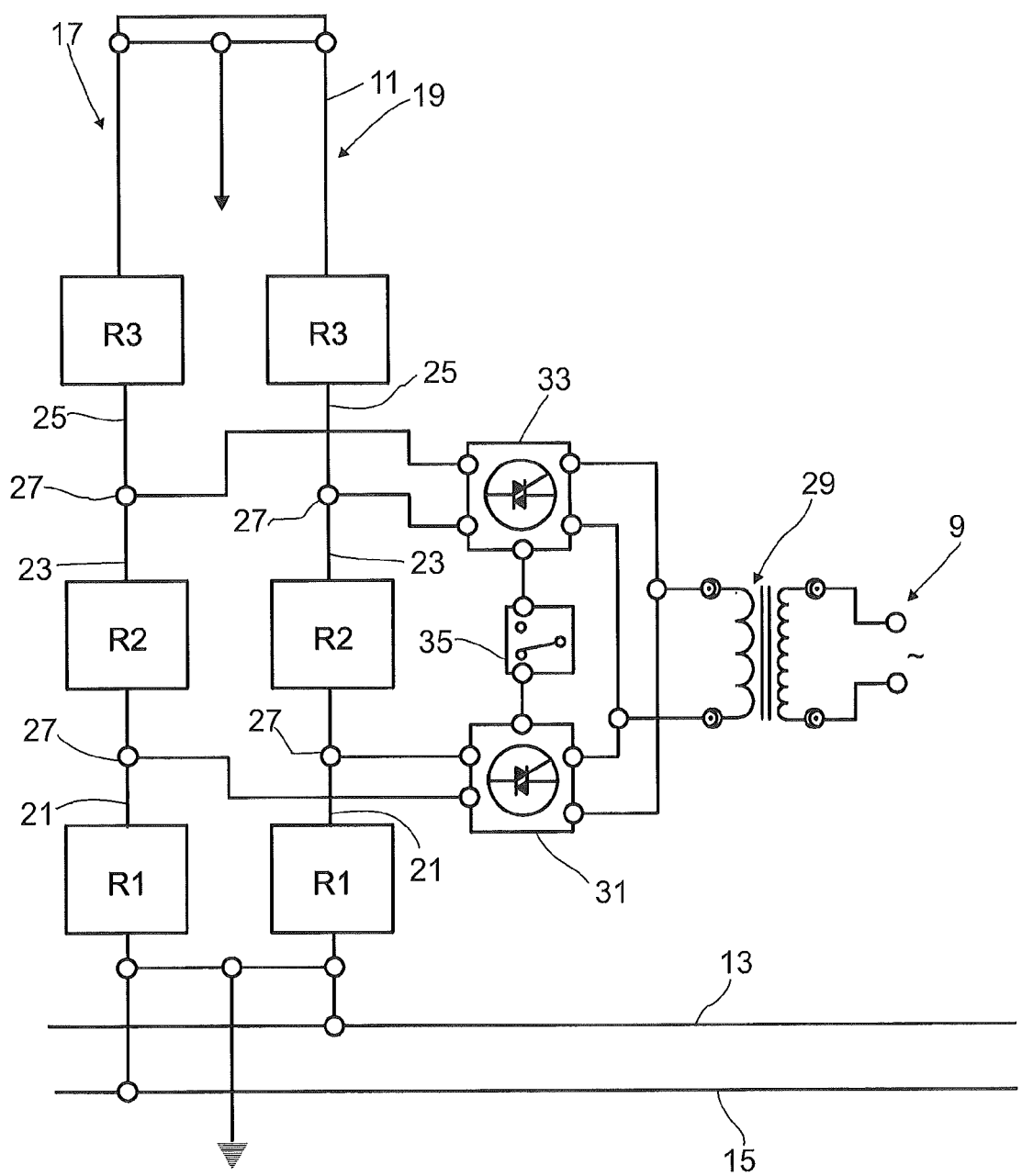
Figure 4:
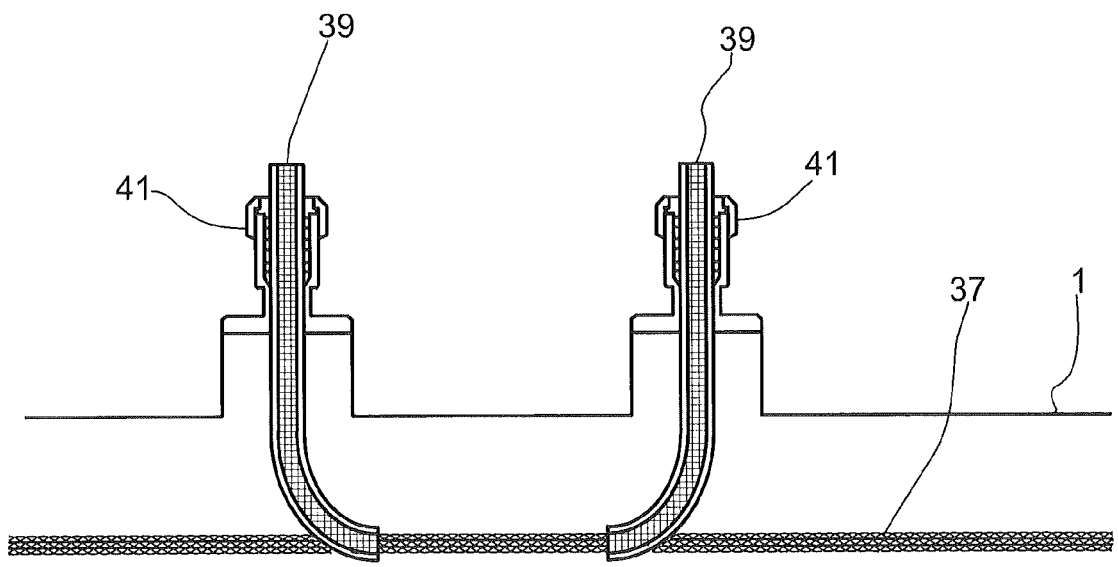
Figure 5:
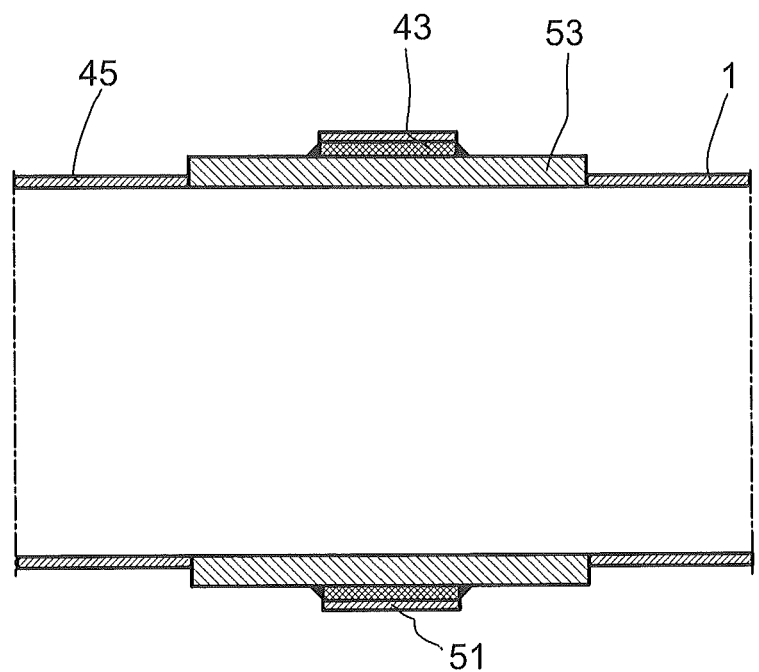
Figure 6:
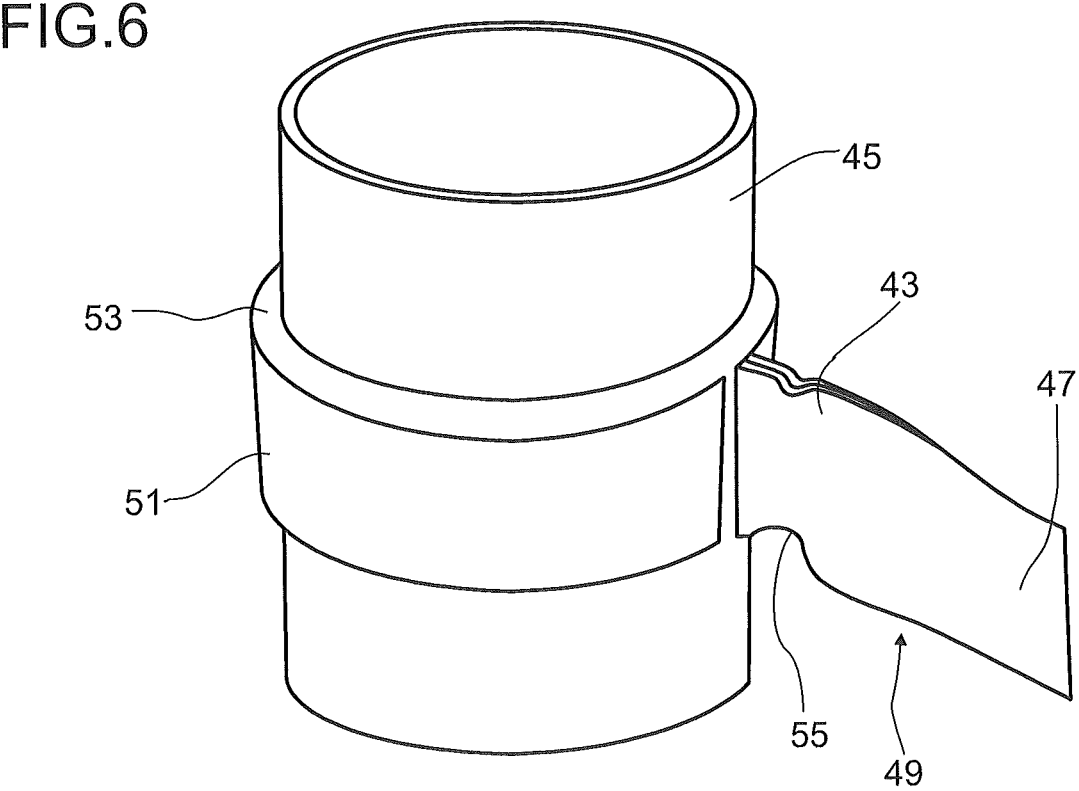
Figure 7:
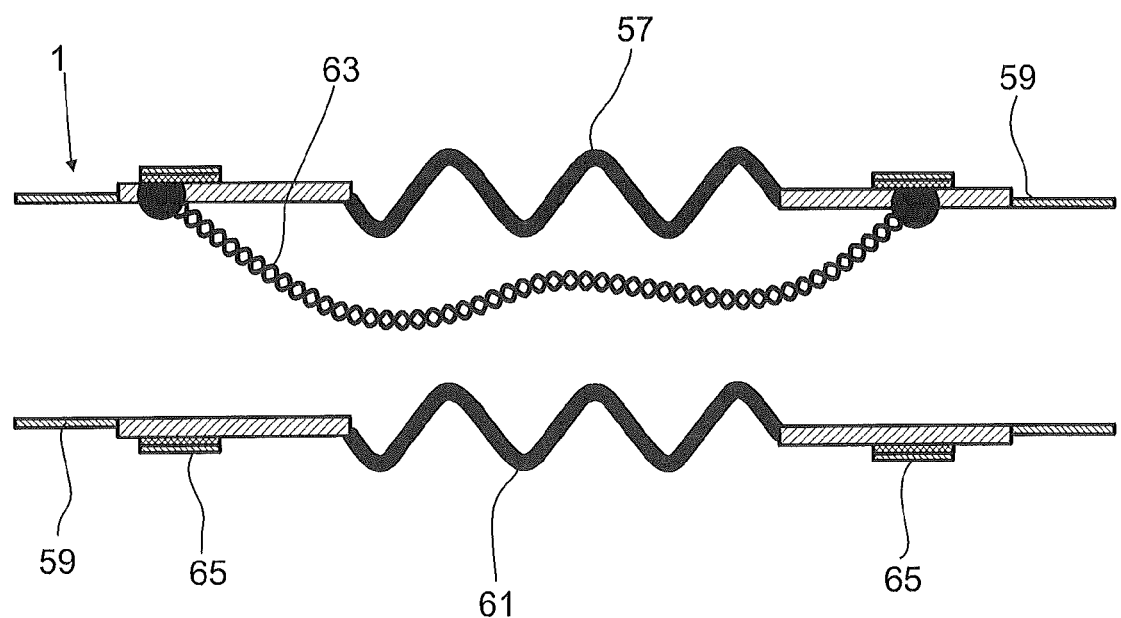

In the figures:

FIG. 1 shows a plurality of pipelines with a central current feed,

FIG. 2 shows a plurality of pipelines which are divided into sections, and wherein each section is connected to a current feed, FIG. 3 shows a pipeline loop in a solar power plant which is divided into two sections and in which current is fed into each section at two positions, FIG. 4 shows a central current feed into a pipeline with an internal heating conductor, FIG. 5 shows an arrangement for feeding high current intensities into a pipe piece in a sectional illustration, FIG. 6 shows an arrangement as shown in FIG. 5 in a three-dimensional arrangement, FIG. 7 shows a connection of two pipeline elements which are used as resistance heating elements.

FIG. 1 shows, by way of example, a plurality of pipelines running parallel to one another with a central current feed.

For heating purposes, a pipeline 1 is equipped with an electrical resistance heating element. The electrical resistance heating element can be, for example, an electrically conductive wall of the pipeline to which a voltage is applied. However, as an alternative, a heating conductor in the form an electrical resistance heating element can be used. Such a heating conductor can run inside the pipeline 1 or rest on the inside or on the outside of the wall of the pipeline 1.

Each pipeline 1 has a first end 3 and a second end 5. A fluid, for example a molten salt in a solar power plant or else oil or another liquid, can flow into the pipeline 1 through the first end 3. The fluid leaves the pipeline again at the second end 5, for example. This makes it possible, for example, to connect in each case the first end 3 of a plurality of pipelines 1 to a distributor (not illustrated here) and in each case the second end 5 of a plurality of pipelines 1 to a collector (not illustrated here). Preferably, in each case the first ends 3 of all of the pipelines 1 are connected to the distributor and the second ends 5 of all of the pipelines 1 are connected to the collector. The collector and distributor can likewise be in the form of pipelines, with the pipelines 1 each branching off from the collector or the distributor.

In the embodiment illustrated in FIG. 1, each pipeline comprises an electrical resistance heating element, which extends from the first end 3 as far as the second end 5. A potential is set in the electrical resistance heating element close to the ground potential at the first end 3 and at the second end 5. For this purpose, the electrical resistance heating elements are all electrically connected to one another. In addition, it is possible, but not necessary, for the electrical resistance heating elements to be grounded at the position at which a potential is set in the electrical resistance heating element close to the ground potential, for example by virtue of an electrical conductor being routed in the ground.

The electrical resistance heating elements are each connected to a phase 7 of an AC source 9 between the positions at which a potential close to the ground potential is set. The number of phases 7 of the AC source 9 corresponds to the number of pipelines 1 in the embodiment illustrated in FIG. 1. If the number of phases 7 is lower than the number of pipelines 1, in each case as many pipelines 1 are combined to form a group as the number of phases 7 that the AC source 9 has. Thus, each pipeline 1 in a group can then be connected to a phase 7 of the AC source 9. For each further group of pipelines 1, a further AC source 9 is then used.

FIG. 2 illustrates a plurality of pipelines which are each divided into a plurality of sections and in which each section is connected to a current feed.

In the case of a long length of the pipelines 1, it may be necessary to use a plurality of AC sources 9 for heating, since the length of the electrical resistance heating element is otherwise too long owing to the length of the pipeline. In this case, the pipelines 1 and therefore also the electrical resistance heating elements are divided into individual sections. The electrical resistance heating elements are electrically conductively connected to one another at the end of each section, with the result that a potential close to the ground potential can be set. The electrical resistance heating element is connected to a phase 7 of an AC source 9 between two positions at which a potential close to the ground potential is set. By virtue of this configuration, each section is constructed in the manner shown in FIG. 1. The positions at which the electrical resistance heating elements are electrically conductively connected to one another in order that a potential close to the ground potential is set in each case describe the end of a section and simultaneously the start of a following section. It is not necessary to electrically conductively connect the electrical resistance heating elements to one another twice, directly adjacent, in order to define once the end of a section and directly next to this the beginning of a new section. In each case one position at which a potential close to the ground potential and one position at which current is fed alternate with one another for the current feed to the sections.

It is possible both in FIG. 1 and in FIG. 2 to provide the current feed centrally between two positions at which a potential close to the ground potential is set. Alternatively, however, the current feed can also take place eccentrically between two positions at which a potential close to the ground potential is set. The position at which the current is fed is in this case dependent on the resistance of the electrical resistance heating element and also on the desired heating power, for example. If the heating is not intended to be homogeneous, the current is fed eccentrically, for example. Owing to the different lengths of the electrical resistance heating element between the current feed and the position at which a potential close to the ground potential is fed, different resistances and therefore also different heating powers result.

As an alternative to the embodiment illustrated in FIGS. 1 and 2 having a plurality of straight pipelines running parallel to one another, the pipelines can also assume any other desired shape. It is thus conventional, for example in solar power plants, for the pipelines to run in the form of a u. In this case, it is possible, for example, for the electrical resistance heating element running through the pipeline 1 to be connected to a current source, in each case centrally in each limb, and for the electrical resistance heating elements to be electrically connected to one another both at the upper ends of the limbs and in the region of the base of the u-shaped pipeline, with the result that a potential close to the ground potential is set both at the ends which are connected to one another and in the center of the pipeline forming the base of the "U". Alternatively, however, it would also be possible to electrically conductively connect the ends of the limbs to one another and to provide the current feed in the base of the "U", which is formed by the pipeline 1.

In addition to the AC source 9 illustrated here, a DC source can also be used. In this case, however, only two electrical resistance heating elements can be connected to the respective terminals of the DC source. An electrical resistance heating element is connected to the positive terminal of the DC source and an electrical resistance heating element is connected to the negative terminal of the DC source.

FIG. 3 illustrates a pipeline loop in a solar power plant which is divided into two sections and in which current is fed into each section at two positions.

In a solar power plant, each pipeline 1 is in the form of a u-shaped pipeline loop 11. The first end 3 of the pipeline loop 11 is connected to a collector 13 and the second end 5 of the pipeline loop is connected to a distributor 15. In the embodiment illustrated here, current is fed in each case into the limbs 17 of the pipeline loop 11, and the electrical resistance heating elements are electrically connected to one another at a low resistance both at those ends of the limbs 17 at which said limbs are connected to the collector 13 or distributor 15 and at the opposite end of the limbs 17 at which said limbs form the base of the "U" in order that a potential close to the ground potential is set.

In the embodiment illustrated in FIG. 3, each limb 17 of the u-shaped pipeline forms a section 19, which is in turn divided into three subsections, a first subsection 21 with a first resistance R1, a second subsection 23 with a second resistance R2 and a third subsection 25 with a third resistance R3.

A current feed 27 is provided in each case between the first subsection 21 and the second subsection 23 and between the second subsection 23 and the third subsection 25. For this purpose, an AC source 9 is used which is connected to a transformer 29. The transformer 29 is adjoined by a first switching device 31, for example a thyristor switching device, and a second switching device 33, which are in turn connected to one another by a changeover switch 35, with the result that either current is fed into the electrical resistance heating elements between the first subsections 21 and the second subsections 23 via the first switching device 31 or current is fed between the second subsections 23 and the third subsections 25 via the second switching device 33.

The respective electrical resistances R1 in the first subsections 21, the respective electrical resistances R2 in the second subsections 23 and the respective electrical resistances R3 in the third subsections 25 are preferably equal in value in order that the phases at the ends which are electrically conductively connected at a low resistance cancel one another out and a potential close to the ground potential is set. In this case, the resistances R1, R2 and R3 can be different in value.

In addition to the thyristor circuit illustrated here, a converter circuit is also possible. By virtue of the transformer 29 which is ungrounded on the secondary side, firstly a floating potential difference is produced, and secondly matching to the resistances of the electrical resistance heating elements is thereby possible.

The way in which the circuit illustrated in FIG. 3 functions will be described by way of example below.

The solar loop illustrated in FIG. 3 has six resistance sections with a pairwise arrangement with the resistances R1, R2 and R3. R1 has, for example, much poorer insulation than the regions R2 and R3.

When R1+R2=R3 in phase 1 and when a voltage is applied between R2 and R3, the solar loop is heated homogeneously with the same quantity of heat everywhere.

When a voltage is applied between R1 and R2 in phase 2, the heating is heterogeneous and is concentrated on the region of R1. This measure makes it possible to compensate, by means of circuitry, for the presumably poor insulation of R1 and to achieve a homogeneous temperature distribution over the solar loop.

For this purpose, the changeover switch in FIG. 3 can be incorporated in a temperature control, for example, which adjusts the setpoint temperature by varying the switch on times of phase 1 and phase 2.

Correspondingly, even given the same resistances R1, R2, R3 of the subsections 21, 23, 25, a different heating power can also be realized in the subsections 21, 23, 25 depending on the current feed, for example when the liquid in the pipeline is heated inhomogeneously.

An exemplary embodiment of a central current feed into an inner heating conductor of a pipeline is illustrated in FIG. 4.

The current feed into an inner heating conductor 37 takes place via two entries 39, which are in the form of a stuffing box packing 41, for example. In order to be able to withstand flow forces occurring in the pipeline, it is necessary to provide the entries with additional strain relief devices, for example, in the form of hooks and eyelets in the region of the entry point, for example.

FIGS. 5 and 6 show an arrangement with which high current intensities can be fed into a pipe piece distributed uniformly over the circumference. In this embodiment, the wall of the pipeline forms the electrical resistance heating element.

The arrangement for feeding high current intensities comprises a metal strip 43, which is welded on a pipe piece 45. Preferably, the metal strip 43 and the pipe piece 45 are manufactured from the same metal. The metal strip 43 has a length which is dimensioned such that, after welding, a lug 47 protrudes sidewards from the pipe. An electrical connection can then be produced, for example by means of a clamping device or screw connection not illustrated here, at the free end 49 of the lug 47. This arrangement has the advantage that the electrical connection is now only subject to a low thermal load. A low thermal load is in particular achieved by virtue of the fact that the length of the lug 47 and therefore the distance from the pipeline 1 are selected to be sufficiently large.

In order to produce good thermal and electrical contact, the metal strip 43 is drawn as tightly as possible onto the pipe piece 45 and welded to the pipe piece 45. A further improvement of the contact can be achieved, for example, by introducing contact-improving materials, for example soldering materials, between the pipe piece 45 and the metal strip 43.

If the metal strip 43 is manufactured from the same material as the pipeline, for example from stainless steel, said metal strip has comparatively poor electrical conductivity. In order to improve the conductivity, it is possible, for example, to apply a layer 51 of a material with good electrical conductivity, for example, copper, to the metal strip 43. The method for applying the layer 51 needs to be suitable for applying a thick electrically conductive layer. In this case, the layer 51 can be applied to the metal strip 43 for example by plating, in particular explosion plating. The thickness of the metal strip 43 and of the layer 51 consisting of a material with good electrical conductivity are dependent in particular on the electrical current intensity required. Thus, for example, an approximately 20 mm-wide and 3 mm-thick metal strip 43 which is coated with a 3 mm-thick layer 51 of copper is suitable for feeding an electrical current of 1000 A.

By drawing up the metal strip 43, forces are introduced into the pipe piece 45. In order to exclude the possibility of impermissible deformation, it is therefore necessary to manufacture the pipe piece 45 so as to be sufficiently stable, i.e. with a sufficiently large wall thickness. In the case of thin-walled pipe pieces, the stability can be achieved, for example, by laying a steel band around said pipe pieces in order to form a reinforced region 53.

If the arrangement illustrated here for feeding current is operated using a Joule heater, it is possible to observe that this arrangement has a lower temperature than the heated pipeline. By virtue of a tapering 55 of the metal strip in the vicinity of the pipeline 1, a hot spot can be produced in a targeted manner, which hot spot can heat the region of the current feed by thermal conduction.

FIG. 7 shows a connection between two pipeline elements which are used as resistance heating elements.

In order to compensate for thermally induced pipeline movements, it is necessary to build compensators 57 into long pipelines 1, by means of which compensators pipeline sections 59 which are connected by the compensators 57 are decoupled with respect to mechanical forces. If the pipeline sections 59 are heated by a Joule heater, the high currents necessary for this need to be passed via the compensators 57. In order that no hot or cold spots form on the compensator 57, the electrical resistivity of the compensator 57 needs to be exactly as high as that of the rest of the pipeline 1. Furthermore, the specific heat capacity of the compensator must also correspond to that of the rest of the pipeline. If this is not the case, there is the risk of cold or hot spots being able to form temporarily during the heating phase.

A good approximation to these conditions is achieved if a compensator 57 in the form of a corrugated tube is used, and in which case the wall thickness of the compensator bellows 61 corresponds to that of the pipeline. In this case, it is furthermore necessary to take into consideration the fact that the electrical resistance of the compensator 57 increases tangentially by means of the corrugation of the compensator bellows 61. Compensators which are not based on a corrugated tube may possibly not be incorporated in the Joule heating system at all. It is also possible for mechanical requirements placed on the compensator 57 to make the adjustment of a suitable electrical resistance much more difficult.

In order to counteract these difficulties, it is possible to provide a flexible adapter conductor 63 within or outside the compensator 57. With the adapter conductor 63, the electrical resistance of the compensator 57 can be adjusted to the value of the rest of the pipeline without significantly changing the mechanical properties of the compensator. Possible adaptation parameters are, for example, thickness, length and material of the adapter conductor 63. By virtue of the use of the adapter conductor 63, all compensators, even those which are not based on corrugated tubes, can be included in a Joule heating circuit. In addition to only one adapter conductor 63, it is also possible to use a plurality of adapter conductors 63.

The electrical currents from the adapter conductors are introduced into the pipeline at one point. In order to distribute the currents from this point uniformly over the pipeline circumference, metal strips 65 with a low electrical resistance can be used, which are drawn around the pipeline 1 and welded. For this purpose, copper-plated stainless steel strips can be used, for example.

It is preferred if, as illustrated in FIG. 7, internal heating conductors which are laid in the interior of the compensator are used as conductors. In particular, those internal heating conductors which develop heat and can concentrate an internally running melt channel are preferred. Such internal heating conductors have, for example, a groove or are in the form of a tube with openings distributed over the circumference. Heating conductors which comprise a plurality of lines which are twisted to form a cable can also be used. By virtue of the use of a heated conductor which can form internally running melt channels, melts can be discharged through the melt channels beyond the compensator. As a result, damage to the compensator by an increase in volume on melting can be counteracted.

LIST OF REFERENCE SYMBOLS

1 Pipeline
3 First end
5 Second end
7 Phase
9 AC source
11 Pipeline loop
13 Collector
15 Distributor
17 Limb
19 Section
21 First subsection
23 Second subsection
25 Third subsection
27 Current feed
29 Transformer
31 First switching device 33 Second switching device
35 Changeover switch
37 Internal heating conductor
39 Entry
41 Stuffing box packing
43 Metal strip
45 Pipe piece
47 Lug
49 Free end
51 Layer of material with good electrical conductivity
53 Reinforced region
55 Tapering
57 Compensator
59 Pipeline section
61 Compensator bellows
63 Adapter conductor
65 Metal strip
R1 First resistance
R2 Second resistance
R3 Third resistance

We claim:

1. An apparatus for heating a pipeline system, comprising at least two pipelines (1), along which in each case one electrical resistance heating element (37) extends, wherein a potential close to the ground potential is set at each electrical resistance heating element (37) at at least one end (3, 5), and the electrical resistance heating element (37) is connected to a terminal of a DC source or to in each case one phase (7) of an n-phase AC source (9) at a position remote from this end (3, 5), where, when using an n-phase AC source (9), n is an integer equal to or greater than 2.

2. The apparatus according to claim 1, wherein a potential close to the ground potential is set at the electrical resistance heating element (37) at both ends, and the electrical resistance heating element (37) is connected to the terminal of the DC source or the phase of the AC source (9) between the ends.

3. The apparatus according to claim 2, wherein the DC source or the phase of an AC source are floating, with only a voltage difference but no absolute potential being present at the voltage source.

4. The apparatus according to claim 1, wherein each electrical resistance heating element (37) is divided into at least two sections (19), with a potential close to the ground potential being set at the ends of each section (19), and a terminal of a DC source or a phase of an AC source (9) being connected between the ends, with in each case the ends of all sections (19) which are fed from a DC source or an n-phase AC source (9) being electrically connected to one another.

5. The apparatus according to claim 4, wherein each section (19) is fed from at least two current sources (9), with the possibility of each current source being a DC source or an AC source (9), and with the current sources each being connected at different positions on the electrical resistance heating element (37).

6. The apparatus according to claim 5, wherein at least one current source (9), from which the section (19) is fed, is a DC source and at least one current source is an AC source.

7. The apparatus according to claim 5, wherein all of the current sources (9) are AC sources or all of the current sources are DC sources, with the current sources being operated alternately such that in each case only one current source feeds current into the section.

8. The apparatus according to claim 5, wherein all of the current sources (9) are AC sources, which are operated at different frequencies or on phases which are shifted with respect to one another, the current sources feeding current simultaneously or alternately.

9. The apparatus according to claim 1, wherein, when using DC sources, in the event of a number of pipelines (1) which is greater than two, in each case two pipelines are combined to form a group, with the electrical resistance heating elements (37) in said group being connected to the terminals of a DC source, or, when using n-phase AC sources (9), in the event of a number of pipelines (1) which is greater than n, in each case n pipelines (1) are combined to form a group, with the electrical resistance heating elements (37) in said group being connected to the phases of an AC source (9).

10. The apparatus according to claim 1, wherein the electrical resistance heating element (37) is a heating conductor routed in the pipeline {1).

11. The apparatus according to claim 1, wherein the wall of the pipeline (1) is at least partially electrically conductive, and the electrical resistance heating element is formed by the wall of the pipeline (1).

12. The apparatus according to claim 11, characterized in that, in order to introduce current, a metal strip (43) coated with a layer (51) of a material with good electrical conductivity is fastened electrically conductively radially on the wall of the pipeline (1), and the metal strip (43) has a lug (47) protruding away from the pipeline, at which lug a current source can be connected.

13. The apparatus according to claim 11, characterized in that compensators (57) are accommodated in the pipeline (1), wherein electrical contact is made between the pipeline sections (59) which are connected by a compensator (57) by at least one adapter conductor (61) passing through the compensator.

14. The apparatus according to claim 1, wherein a heat transfer agent flows through the pipelines (1).

15. The apparatus according to claim 1, wherein the pipelines (1) are heating loops in a solar power station.

* * * * *